(12) United States Patent
Wu

(10) Patent No.: US 12,078,894 B2
(45) Date of Patent: Sep. 3, 2024

(54) ARRAY SUBSTRATE AND DISPLAY DEVICE

(71) Applicant: TCL CHINA STAR OPTOELECTRONICS TECHNOLOGY CO., LTD., Shenzhen (CN)

(72) Inventor: Wanchun Wu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/770,616

(22) PCT Filed: Apr. 15, 2022

(86) PCT No.: PCT/CN2022/087145
§ 371 (c)(1),
(2) Date: Apr. 20, 2022

(87) PCT Pub. No.: WO2023/178765
PCT Pub. Date: Sep. 28, 2023

(65) Prior Publication Data
US 2024/0142828 A1     May 2, 2024

(30) Foreign Application Priority Data
Mar. 24, 2022   (CN) .......................... 202210303078.5

(51) Int. Cl.
*G02F 1/1343*     (2006.01)
(52) U.S. Cl.
CPC .............................. *G02F 1/134345* (2021.01)

(58) Field of Classification Search
CPC .................................................... G02F 1/1343
See application file for complete search history.

(56) References Cited

U.S. PATENT DOCUMENTS

| 2016/0202575 | A1* | 7/2016 | Youk | G02F 1/134336 |
| | | | | 349/110 |
| 2020/0257174 | A1* | 8/2020 | Cao | G02F 1/134336 |
| 2024/0012297 | A1* | 1/2024 | Chen | G02F 1/133707 |

FOREIGN PATENT DOCUMENTS

| CN | 102768443 A | 11/2012 |
| CN | 104576659 A | 4/2015 |

(Continued)

OTHER PUBLICATIONS

PCT International Search Report for International Application No. PCT/CN2022/087145, mailed on Nov. 30, 2022, 8pp.

(Continued)

*Primary Examiner* — Sang V Nguyen
(74) *Attorney, Agent, or Firm* — The Roy Gross Law Firm, LLC; Roy Gross

(57) ABSTRACT

An array substrate and a display device are disclosed in the present application, the substrate includes a plurality of pixel units, one pixel unit at least comprises a first sub-pixel unit; a pixel electrode at least comprises a first pixel sub-electrode, the first pixel sub-electrode is arranged in the first sub-pixel unit, and comprises a plurality of branch electrodes; wherein the first sub-pixel unit at least comprises a first electrode sub-region and a second electrode sub-region, widths of the branch electrodes in the first electrode sub-region and the second electrode sub-region are different.

20 Claims, 7 Drawing Sheets

(56) References Cited

FOREIGN PATENT DOCUMENTS

| CN | 104849922 | A | | 8/2015 | | |
|---|---|---|---|---|---|---|
| CN | 106444178 | | * | 2/2017 | ........... | G02F 1/1343 |
| CN | 106444178 | A | | 2/2017 | | |
| CN | 106707628 | A | | 5/2017 | | |
| CN | 107037645 | A | | 8/2017 | | |
| CN | 107247371 | A | | 10/2017 | | |
| CN | 107589602 | A | | 1/2018 | | |
| CN | 109375434 | A | | 2/2019 | | |
| CN | 109375435 | A | | 2/2019 | | |
| CN | 209103058 | U | | 7/2019 | | |
| CN | 112859459 | A | | 5/2021 | | |
| CN | 113641045 | A | | 11/2021 | | |

OTHER PUBLICATIONS

PCT Written Opinion of the International Search Authority for International Application No. PCT/CN2022/087145, mailed on Nov. 30, 2022, 7pp.

Chinese Office Action issued in corresponding Chinese Patent Application No. 202210303078.5 dated Jun. 9, 2023, pp. 1-8, 19pp.

* cited by examiner

ARRAY SUBSTRATE AND DISPLAY DEVICE

CROSS REFERENCE TO RELATED APPLICATIONS

This application is a National Phase of PCT Patent Application No. PCT/CN2022/087145 having International filing date of Apr. 15, 2022, which claims the benefit of priority of Chinese Patent Application No. 202210303078.5, filed Mar. 24, 2022, the contents of which are all incorporated herein by reference in their entirety.

FIELD OF DISCLOSURE

The present application relates to a technical field of displays, and specifically to an array substrate and a display device.

BACKGROUND OF DISCLOSURE

Currently, liquid crystal displays (LCDs) are one of the most widely used displays, the LCDs include a pixel electrode and a common electrode, and a liquid crystal layer is arranged between the pixel electrode and the common electrode, when a voltage is applied to the pixel electrode and the common electrode, an electric field is generated in the liquid crystal layer, and liquid crystal molecules are deflected under an action of the electric field, thereby controlling a transmission situation of light to make the LCDs display images.

However, when an LCD display screen is viewed from different angles, there will be a problem of color shift. In order to solve above problem, an LCD display with a low degree of color shift is urgently needed.

Technical Problem

Embodiments of the present application provide an array substrate and a display device, so as to solve a technical problem of color shift when an LCD display screen is viewed from different angles.

SUMMARY OF DISCLOSURE

In order to solve the above-mentioned problem, technical solutions provided by the present application are as follows:

According to an embodiment of the present application, in one aspect, the present application provides an array substrate, the array substrate comprises: a base substrate and a plurality of pixel units arranged on the base substrate at intervals, each of the pixel units at least comprising a first sub-pixel unit and a second sub-pixel unit; a pixel electrode arranged in the pixel unit, and the pixel electrode at least comprising a first pixel sub-electrode and a second pixel sub-electrode, the first pixel sub-electrode and the second pixel sub-electrode being arranged in the first sub-pixel unit and the second sub-pixel unit respectively, the first pixel sub-electrode comprising a trunk electrode and a plurality of branch electrodes connected to the trunk electrode respectively;

wherein, the first sub-pixel unit at least comprises a first electrode sub-region and a second electrode sub-region, and widths of the branch electrodes in the first electrode sub-region and the second electrode sub-region are different.

According to an embodiment of the present application, the plurality of the branch electrodes comprise a first branch electrode located in the first electrode sub-region and a second branch electrode located in the second electrode sub-region, widths of the first branch electrode and the second branch electrode are different.

According to an embodiment of the present application, the first sub-pixel unit comprises the first electrode sub-region and the second electrode sub-region, an area of the first electrode sub-region accounts for 20% to 40% of a total area of the first sub-pixel unit.

According to an embodiment of the present application, at least one of the branch electrodes comprises a first electrode segment located in the first electrode sub-region and a second electrode segment located in the second electrode sub-region, widths of the first electrode segment and the second electrode segment are different.

According to an embodiment of the present application, the first sub-pixel unit comprises the first electrode sub-region and the second electrode sub-region, an area of the first electrode sub-region accounts for 20% to 40% of a total area of the first sub-pixel unit.

According to an embodiment of the present application, the second pixel sub-electrode comprises a trunk electrode and a plurality of branch electrodes connected to the trunk electrode respectively;

the second sub-pixel unit at least comprises a third electrode sub-region and a fourth electrode sub-region, widths of the branch electrodes in the third electrode sub-region and the fourth electrode sub-region are different.

According to an embodiment of the present application, an area of the first sub-pixel unit is less than an area of the second sub-pixel unit, an area ratio of the first electrode sub-region in the first sub-pixel unit is same as an area ratio of the third electrode sub-region in the second sub-pixel unit.

According to an embodiment of the present application, the first sub-pixel unit comprises a cross-shaped first trunk electrode and a first sub-electrode connected to the first trunk electrode, the first trunk electrode divides the first sub-pixel unit into four main display domains, the first sub-electrode extends from the first trunk electrode along a different direction, and extending directions of the first sub-electrodes in a same main display domain are same; and/or the second sub-pixel unit comprises a cross-shaped second trunk electrode and a second sub-electrode connected to the second trunk electrode, the second trunk electrode divides the second sub-pixel unit into four secondary display domains, the second sub-electrode extends from the second trunk electrode along a different direction, and extending directions of the second sub-electrodes in a same secondary display domain are same;

wherein the first sub-electrode has a first width in the first electrode sub-region and a second width in the second electrode sub-region, the first width is different from the second width; the second sub-electrode has a third width in the third electrode sub-region and a fourth width in the fourth electrode sub-region, the third width is different from the fourth width.

According to an embodiment of the present application, in any one of the main display domains, at least one of the first sub-electrodes comprises a first sub-electrode segment with the first width and a second sub-electrode segment with the second width, in any one of the secondary display domains, the second sub-electrode comprises a third sub-electrode segment with the third width and a fourth sub-electrode segment with the fourth width.

According to an embodiment of the present application, widths of the first sub-electrodes in each of the main display domains are equal, widths of the second sub-electrodes in each of the secondary display domains are equal, the first sub-electrodes in at least one of the main display domains have the first width, and the first sub-electrodes in at least one of the main display domains have the second width; the second sub-electrodes in at least one of the secondary display domains have the third width, the second sub-electrodes in at least one of the secondary display domains have the fourth width.

According to an embodiment of the present application, the first sub-pixel unit comprises the first electrode sub-region, the second electrode sub-region, and a fifth electrode sub-region, the plurality of the branch electrodes comprise a first electrode located in the first electrode sub-region, a second electrode located in the second electrode sub-region, and a third electrode located in the fifth electrode sub-region, widths of the first electrode, the second electrode, and the third electrode are different from each other.

According to an embodiment of the present application, a width difference of the branch electrodes with different widths in the first electrode sub-region and the second electrode sub-region ranges from 0.15 um to 0.35 um.

According to an embodiment of the present application, in another aspect, the present application provides a display device, comprising an array substrate, wherein the array substrate comprises:

a base substrate and a plurality of pixel units arranged on the base substrate at intervals, each of the pixel units at least comprising a first sub-pixel unit and a second sub-pixel unit; a pixel electrode arranged in the pixel unit, and the pixel electrode at least comprising a first pixel sub-electrode and a second pixel sub-electrode, the first pixel sub-electrode and the second pixel sub-electrode being arranged in the first sub-pixel unit and the second sub-pixel unit respectively, the first pixel sub-electrode comprising a trunk electrode and a plurality of branch electrodes connected to the trunk electrode respectively;

wherein, the first sub-pixel unit at least comprises a first electrode sub-region and a second electrode sub-region, and widths of the branch electrodes in the first electrode sub-region and the second electrode sub-region are different.

According to an embodiment of the present application, wherein the plurality of the branch electrodes comprise a first branch electrode located in the first electrode sub-region and a second branch electrode located in the second electrode sub-region, widths of the first branch electrode and the second branch electrode are different.

According to an embodiment of the present application, wherein the first sub-pixel unit comprises the first electrode sub-region and the second electrode sub-region, an area of the first electrode sub-region accounts for 20% to 40% of a total area of the first sub-pixel unit.

According to an embodiment of the present application, wherein at least one of the branch electrodes comprises a first electrode segment located in the first electrode sub-region and a second electrode segment located in the second electrode sub-region, widths of the first electrode segment and the second electrode segment are different.

According to an embodiment of the present application, wherein the first sub-pixel unit comprises the first electrode sub-region and the second electrode sub-region, an area of the first electrode sub-region accounts for 20% to 40% of a total area of the first sub-pixel unit.

According to an embodiment of the present application, wherein the second pixel sub-electrode comprises a trunk electrode and a plurality of branch electrodes connected to the trunk electrode respectively;

the second sub-pixel unit at least comprises a third electrode sub-region and a fourth electrode sub-region, widths of the branch electrodes in the third electrode sub-region and the fourth electrode sub-region are different.

According to an embodiment of the present application, wherein an area of the first sub-pixel unit is less than an area of the second sub-pixel unit, an area ratio of the first electrode sub-region in the first sub-pixel unit is same as an area ratio of the third electrode sub-region in the second sub-pixel unit.

According to an embodiment of the present application, wherein the first sub-pixel unit comprises a cross-shaped first trunk electrode and a first sub-electrode connected to the first trunk electrode, the first trunk electrode divides the first sub-pixel unit into four main display domains, the first sub-electrode extends from the first trunk electrode along a different direction, and extending directions of the first sub-electrodes in a same main display domain are same; and/or the second sub-pixel unit comprises a cross-shaped second trunk electrode and a second sub-electrode connected to the second trunk electrode, the second trunk electrode divides the second sub-pixel unit into four secondary display domains, the second sub-electrode extends from the second trunk electrode along a different direction, and extending directions of the second sub-electrodes in a same secondary display domain are same;

wherein the first sub-electrode has a first width in the first electrode sub-region and a second width in the second electrode sub-region, the first width is different from the second width; the second sub-electrode has a third width in the third electrode sub-region and a fourth width in the fourth electrode sub-region, the third width is different from the fourth width.

The pixel unit in the array substrate of the present application includes at least a first sub-pixel unit and a second sub-pixel unit, and the pixel electrode is configured to include at least a first pixel sub-electrode and a second pixel sub-electrode, the first pixel sub-electrode and the second pixel sub-electrode are arranged in the first sub-pixel unit and the second sub-pixel unit respectively, moreover, the first pixel sub-electrode includes a trunk electrode and a plurality of branch electrodes connected to the trunk electrode respectively, meanwhile the first sub-pixel unit is arranged to include at least a first electrode sub-region and a second electrode sub-region, widths of the branch electrodes in the first electrode sub-region and the second electrode sub-region are different, so that capacitance structures of the first sub-pixel unit in the first electrode sub-region and the second electrode sub-region have different capacitance to form different electric fields, so that liquid crystals in different regions in the pixel unit can be deflected to different angles, a plurality of viewing angles are formed inside a same pixel unit to achieve complementary viewing angles and to solve a problem of color shift of LCD panels.

DETAILED DESCRIPTION OF PREFERRED EMBODIMENTS

Figure 1:
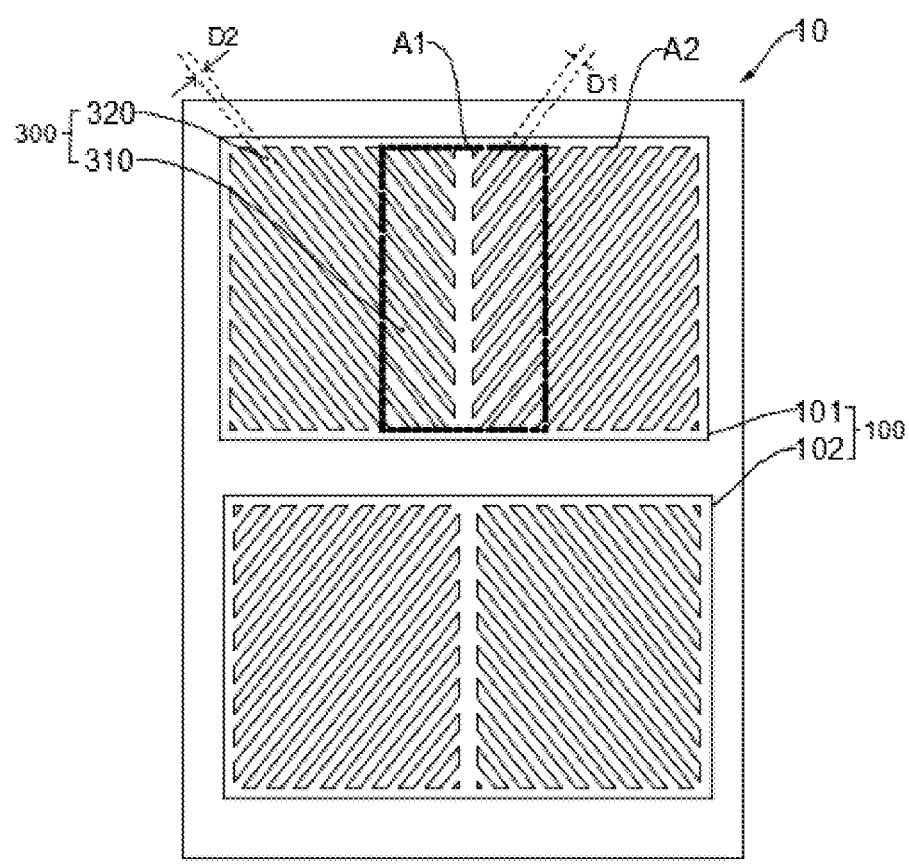
FIG. 1 is a schematic structural diagram of a pixel electrode provided by an embodiment of the present application.

The present application provides an array substrate and a display device, in order to make purpose, technical solutions and effects of the present application clearer and clearer, the present application will be further described in detail below with reference to the accompanying drawings and examples. It should be understood that a specific embodiments described here are only used to explain the present application, but not to limit the present application.

In order to solve the above technical problems, the present application provides following technical solutions, with specific reference to FIG. 1 to FIG. 9.

An embodiment of the present application provides an array substrate, including a base substrate and a plurality of pixel units 10 arranged on the base substrate at intervals, wherein, each of the pixel units 10 at least includes a first sub-pixel unit and a second sub-pixel unit; a pixel electrode 100, arranged in the pixel unit 10, and the pixel electrode 100 at least comprises a first pixel sub-electrode 101 and a second pixel sub-electrode 102, the first pixel sub-electrode 101 and the second pixel sub-electrode 102 are arranged in the first sub-pixel unit and the second sub-pixel unit respectively, and the first pixel sub-electrode 101 includes a trunk electrode 200 and a plurality of branch electrodes 300 connected to the trunk electrode 200;

wherein the first sub-pixel unit at least comprises a first electrode sub-region A1 and a second electrode sub-region A2, widths of the branch electrodes 300 in the first electrode sub-region A1 and the second electrode sub-region A2 are different.

Specifically, the array substrate is used for LCD, the LCD includes an array substrate and a color filter substrate, a liquid crystal layer is arranged between the array substrate and the filter substrate, the array substrate includes a base substrate and a plurality of pixel units 10 arranged in the base substrate, the base substrate includes a control device layer, the control device layer includes a plurality of control devices, the control device is connected to the pixel electrode 100 of a corresponding pixel unit 10.

Figure 2:
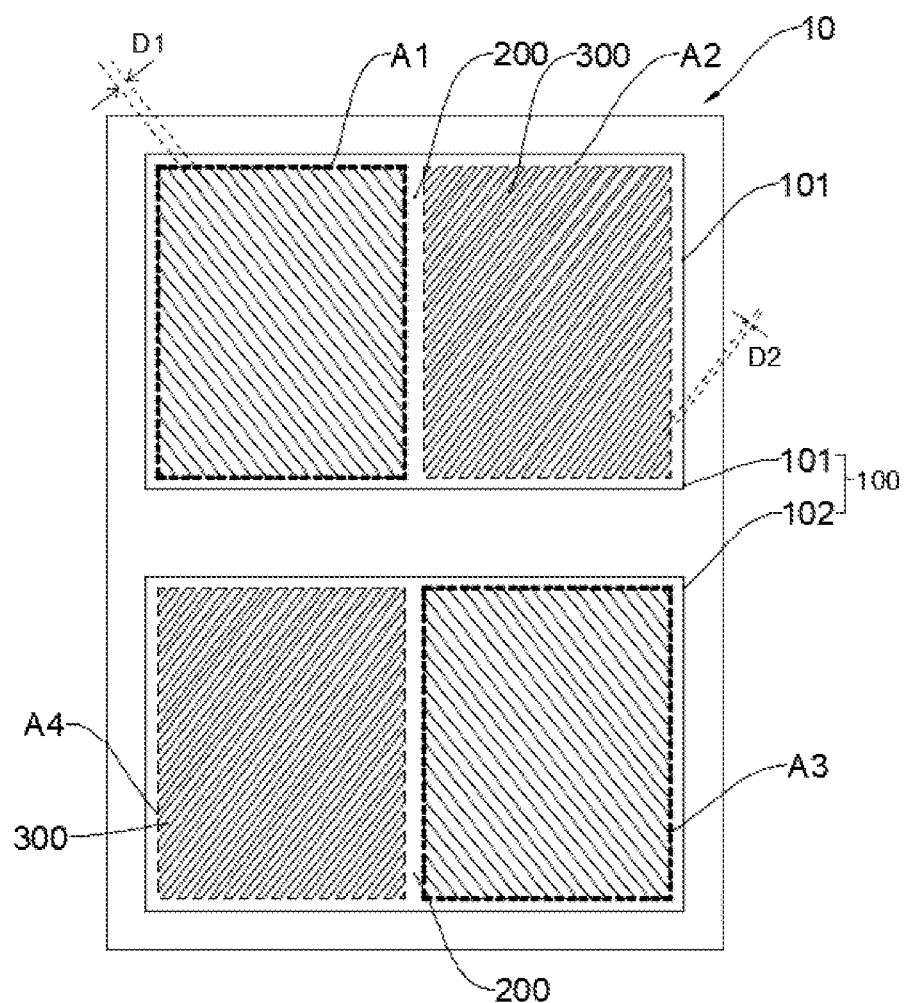
FIG. 2 is a schematic structural diagram of another pixel electrode provided by an embodiment of the present application.
Figure 3:
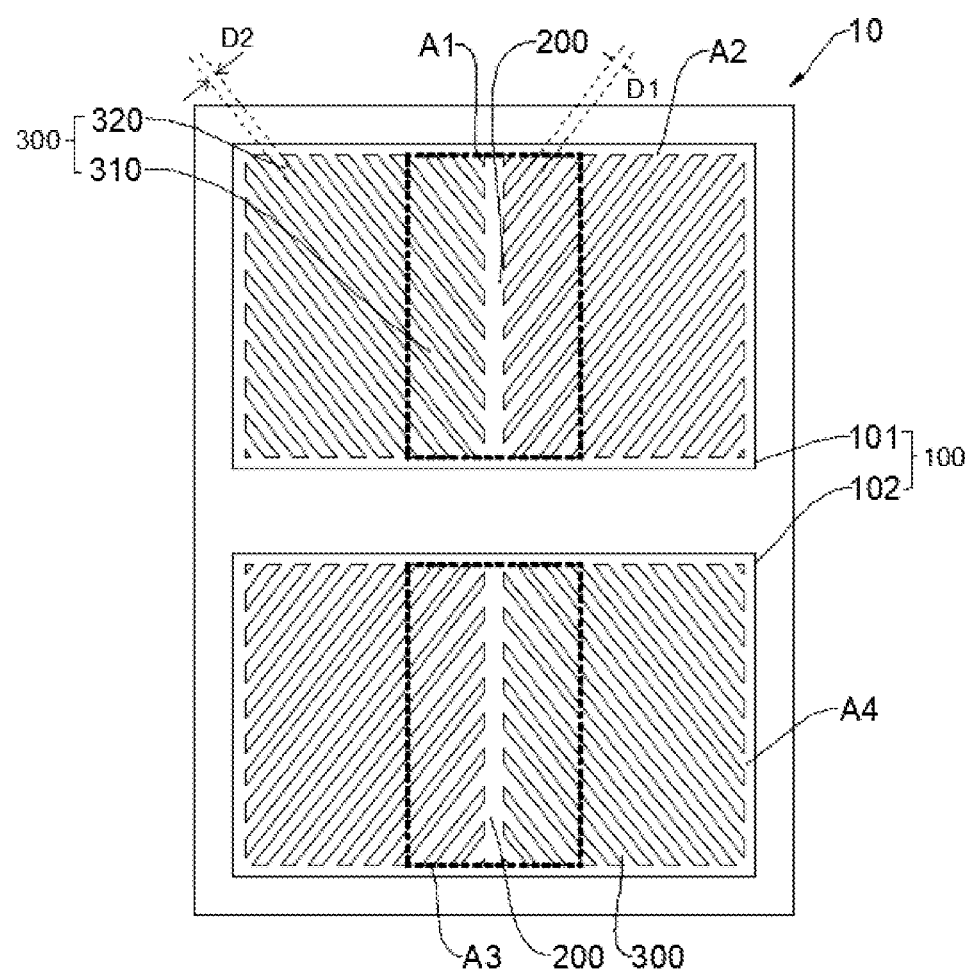
FIG. 3 is a schematic structural diagram of yet another pixel electrode provided by an embodiment of the present application.
Figure 4:
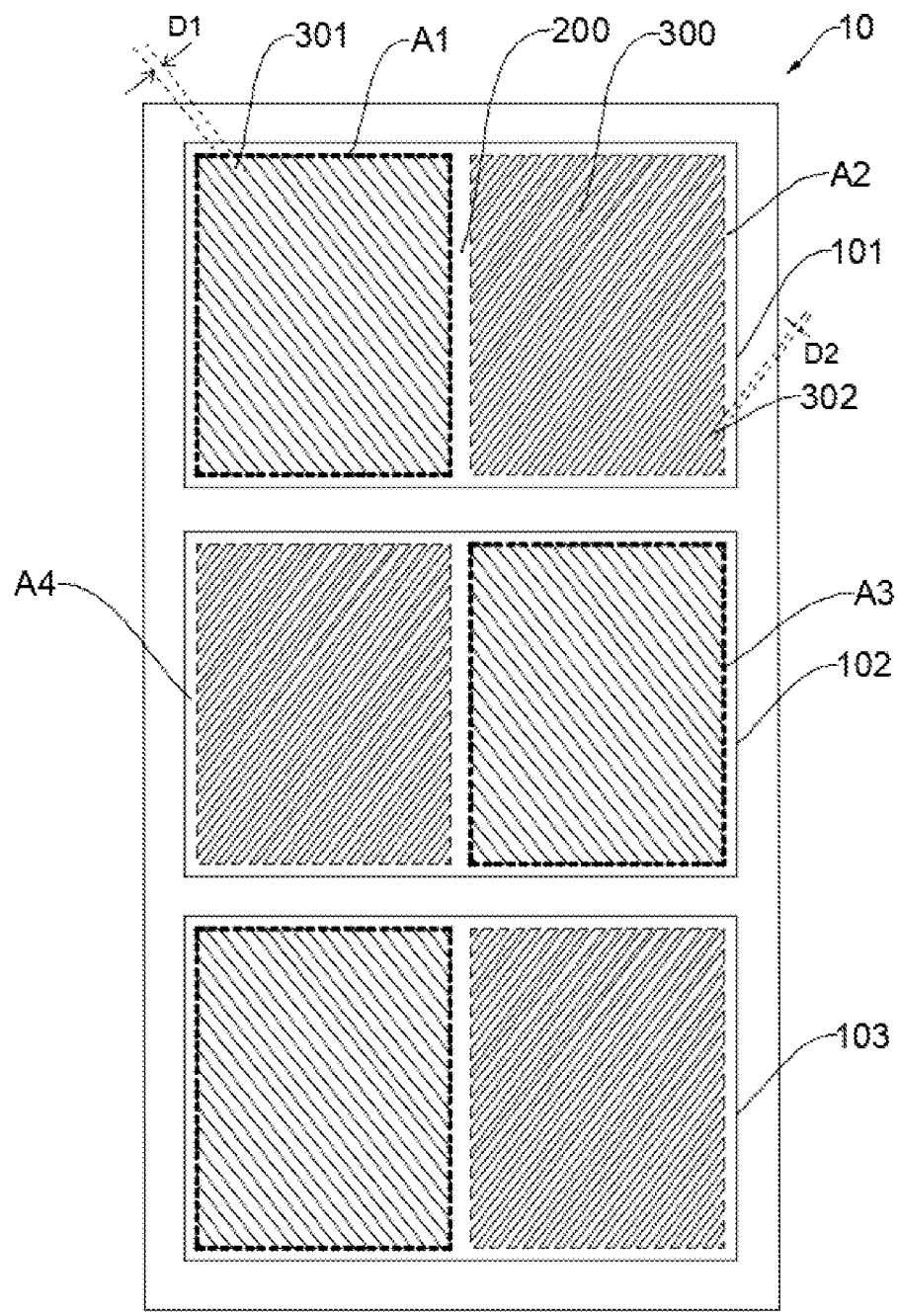
FIG. 4 is a schematic structural diagram of a pixel electrode including three pixel sub-electrodes provided by an embodiment of the present application.

Specifically, the pixel unit 10 at least includes a first sub-pixel unit and a second sub-pixel unit, the pixel electrode at least includes a first pixel sub-electrode 101 and a second pixel sub-electrode 102;

it should be noted that the pixel unit 10 further includes slits between the branch electrodes 300;

one pixel electrode 100 is arranged in one of the pixel units 10, the first pixel sub-electrode 101 is arranged in the first sub-pixel unit, the second pixel sub-electrode 102 is arranged in the first sub-pixel unit;

As shown in FIGS. 1 to 4, in FIG. 1, FIG. 2, and FIG. 3, one pixel electrode 100 includes a first pixel sub-electrode 101 and a second pixel sub-electrode 102; one pixel electrode 100 in FIG. 4 includes three pixel sub-electrodes, namely a first pixel sub-electrode 101, a second pixel sub-electrode 102, and a third pixel sub-electrode 103, an arrangement of the plurality of the pixel sub-electrodes is not limited. FIGS. 1 to 4 are all arranged in columns.

Specifically, the first pixel sub-electrode 101 includes a trunk electrode 200 and a plurality of branch electrodes 300 connected to the trunk electrode 200, the trunk electrode 200 can divide a region where the corresponding pixel sub-electrodes are located into a plurality of domain regions, extending directions of the branch electrodes 300 in each of the domain regions are same, widths of the trunk electrode 200 can be equal or not equal.

It should be noted that an arrangement of the second pixel sub-electrode 102 may be same as an arrangement of the first pixel sub-electrode 101, or may be different from an arrangement of the first pixel sub-electrode 101.

Specifically, the first sub-pixel unit at least includes a first electrode sub-region A1 and a second electrode sub-region A2, in the embodiment, only the first electrode sub-region A1 and the second electrode sub-region A2 are provided in the first sub-pixel unit for illustration, as shown in FIG. 1 and FIG. 2, in FIG. 1, an arrangement of the first electrode sub-region A1 and the second electrode sub-region A2 is not limited, and the first electrode sub-region A1 and the second electrode sub-region A2 can be arranged side by side, the second electrode sub-region A2 can also be arranged to surround the first electrode sub-region A1;

Specifically, shapes of the first electrode sub-region A1 and the second electrode sub-region A2 are not limited, and may be any one of a rectangle, a polygon, a diamond, and a circle.

Specifically, a position of the first electrode sub-region A1 in the first sub-pixel unit is not limited. As shown in FIG. 1, the first electrode sub-region A1 may correspond to one domain region, or as shown in FIG. 2, the first electrode sub-region A1 includes partial regions of two different domain regions.

Specifically, as shown in FIG. 2 and FIG. 4, the first electrode sub-region A1 and the second electrode sub-region A2 are arranged side by side, the branch electrodes 300 in the first electrode sub-region A1 may correspond to the branch electrodes 300 in one domain region, or the second electrode sub-region A2 may surround the first electrode sub-region A1, one part of the branch electrodes 300 in the domain region is located in the first electrode sub-region A1, and another part is located in the second electrode sub-region A2, namely, one branch electrode 300 has two widths.

Specifically, a width of the branch electrodes 300 of the first pixel sub-electrode may range from 2.4 um to 3.0 um, specifically, it can be any one of 2.4 um, 2.5 μm, 2.6 um, 2.7 um, 2.8 um, 2.9 um, and 3.0 um, which can be selected according to actual production situations.

Specifically, a width difference between the branch electrodes 300 in the first electrode sub-region A1 and the branch electrodes 300 in the second electrode sub-region A2 ranges from 0.15 um to 0.35 um, specifically, it can be any one of 0.15 um, 0.16 um, 0.20 um, 0.22 um, 0.24 um, 0.27 um, 0.28 um, 0.30 um, 0.31 um, and 0.35 um, which can be selected according to actual production situations.

It should be noted that in the embodiment, the pixel electrode 100 of the pixel unit 10 in the array substrate is arranged to at least include a first pixel sub-electrode 101 and a second pixel sub-electrode 102, and the first pixel sub-electrode 101 includes at least a first electrode sub-region A1 and a second electrode sub-region A2, widths of the branch electrodes 300 in the two electrode sub-regions are different, so that capacitance structures of the first sub-pixel units in the first electrode sub-region A1 and the second electrode sub-region A2 have different capacitance and form different electric fields, so that liquid crystals in different regions of the pixel unit 10 can be deflected by different angles, a plurality of viewing angles are formed inside a same pixel unit 10 to achieve complementary viewing angles and to solve a problem of color shift of liquid crystal display panel.

In an embodiment, as shown in FIG. 4, the plurality of branch electrodes 300 include a first branch electrode 301 located in the first electrode sub-region A1 and a second branch electrode 302 located in the second electrode sub-region A2, widths of the first branch electrode 301 and the second branch electrode 302 are different.

Specifically, as shown in FIG. 2 and FIG. 4, in the embodiment, the branch electrode 300 in the first electrode sub-region A1 is a complete branch electrode 300, and its width is same in each segment;

specifically, in the pixel unit, a width of the branch electrode 300 may range from 2.4 um to 3.0 um, specifically, it can be any one of 2.4 um, 2.5 μm, 2.6 um, 2.7 um, 2.8 um, 2.9 um, and 3.0 um, which can be selected according to actual production situations.

It can be understood that using a technical solution of the present application makes a manufacturing process of the pixel unit 10 simpler.

In one embodiment, as shown in FIG. 1, at least one of the branch electrodes 300 includes a first electrode segment 310 located in the first electrode sub-region A1 and a second electrode segment 320 located in the second electrode sub-region A2, widths of the first electrode segment 310 and the second electrode segment 320 are different.

Specifically, as shown in FIG. 1 and FIG. 2, the first electrode sub-region A1 spans two domain regions, and the second electrode sub-region A2 includes two parts located in two domain regions, therefore, in one domain region at least one of the branch electrodes 300 includes a first electrode segment 310 located in the first electrode sub-region A1 and a second electrode segment 320 located in the second electrode sub-region A2, the two electrode segments are connected with each other.

Specifically, the first electrode segment 310 has a first width D1, the second electrode segment 320 has a second width D2, the first width D1 may be greater than the second width D2, the first width D1 may be less than the second width D2.

Figure 5:
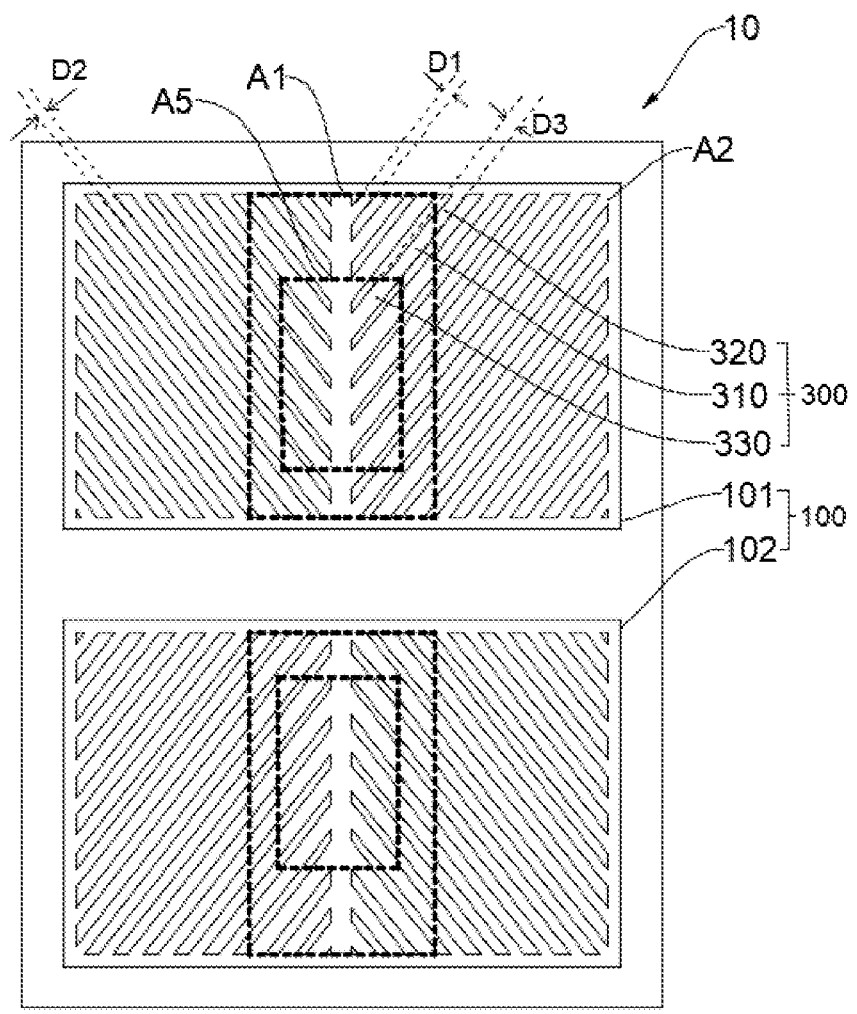
FIG. 5 is a schematic structural diagram of a pixel sub-electrode provided by an embodiment of the present application.

Specifically, as shown in FIG. 5, the first pixel sub-electrode 101 and/or the second pixel sub-electrode 102 includes three electrode sub-regions, the three electrode sub-regions are surrounded and arranged in sequence, at least one of the branch electrodes 300 includes a first electrode segment 310 located in the first electrode sub-region A1, a second electrode segment 320 located in the second electrode sub-region A2, and a third electrode segment 330 located in a fifth electrode sub-region A5, the three electrode segments are an integrally formed structure.

Specifically, as shown in FIG. 5, the first electrode segment 310 has a first width D1, the second electrode segment 320 has a second width D2, the third electrode segment 330 has a third width D3, the first width D1 may be greater than the second width D2, and the second width D2 may be greater than the third width D3; optionally, the first width D1 may be less than the second width D2, and the second width D2 may be less than the third width D3.

Specifically, a width change of the first electrode segment 310 and the second electrode segment 320 of one of the branch electrodes 300 can be a gradual change or a step change, and can be adjusted according to actual production needs.

In an embodiment, the first sub-pixel unit includes the first electrode sub-region A1 and the second electrode sub-region A2, an area of the first electrode sub-region A1 accounts for 20% to 40% of a total area of the first sub-pixel unit.

Specifically, a percentage of the first electrode sub-region A1 to an area of the first sub-pixel unit may be one of 20%, 24%, 25%, 32%, 34%, 37%, and 40%, which may be selected according to actual production situations.

It should be noted that in the embodiment, the area of the first electrode sub-region A1 in the first sub-pixel unit is limited as a percentage of the total area of the first sub-pixel unit, and a corresponding limitation in the embodiment can also be applied to the second sub-pixel unit.

It can be understood that under a condition that a display effect of a display panel is not reduced, reasonably limiting the area of the first electrode sub-region A1 can make an effect of adjusting color shift of the display panel be optimal.

In an embodiment, as shown in FIG. 2 and FIG. 3, the second pixel sub-electrode 102 includes a trunk electrode 200 and a plurality of branch electrodes 300 connected to the trunk electrode 200 respectively;

the second sub-pixel unit at least includes a third electrode sub-region A3 and a fourth electrode sub-region A4, widths of the branch electrodes 300 in the third electrode sub-region A3 and the fourth electrode sub-region A4 are different.

Specifically, an arrangement of the second pixel sub-electrode 102 is similar to an arrangement of the first pixel sub-electrode 101, the second sub-pixel unit at least includes a third electrode sub-region A3 and a fourth electrode sub-region A4, widths of the branch electrodes 300 in the third electrode sub-region A3 and the fourth electrode sub-region A4 are different.

Specifically, a width of the branch electrode 300 in the third electrode sub-region A3 and a width of the branch electrode 300 in the first electrode sub-region A1 (or the second electrode sub-region A2) may be equal or not equal, which can be adjusted according to actual production requirements.

Specifically, a structure and a relative arrangement of the third electrode sub-region A3 and the fourth electrode sub-region A4 may refer to a structure and a relative arrangement of the first electrode sub-region A1 and the second electrode sub-region A2, which will not be repeated here.

It should be understood that by arranging that the second sub-pixel unit at least includes the third electrode sub-region A3 and the fourth electrode sub-region A4, the widths of the branch electrodes 300 in the third electrode sub-region A3 and the fourth electrode sub-region A4 are different, namely an arrangement method of the second sub-pixel unit is similar to an arrangement method of the first sub-pixel unit, making a dual eight-domain structure be formed in the pixel unit, so that a problem of color shift of the display panel can be completely solved, a technical support is provided for a subsequent research and development of high-end display panels.

Figure 6:
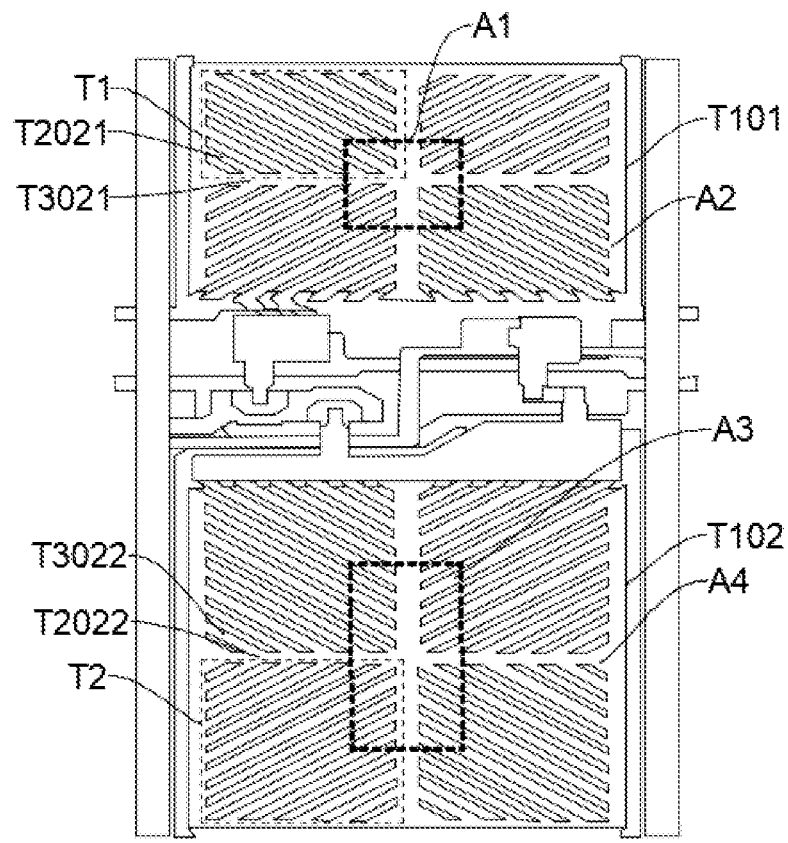
FIG. 6 is a schematic structural diagram of a pixel unit provided by another embodiment of the present application.

In an embodiment, as shown in FIG. 6, an area of the first sub-pixel unit is less than an area of the second sub-pixel unit, an area ratio of the first electrode sub-region A1 to the first sub-pixel unit is same as an area ratio of the third electrode sub-region A3 to the second sub-pixel unit.

Specifically, in the embodiment, the first sub-pixel unit is a main electrode unit T101, the second sub-pixel unit is a sub-electrode unit T102, an area of the main electrode unit T101 is less than the sub-electrode unit T102, an area ratio of the first electrode sub-region A1 to the main electrode unit T101 is same as an area ratio of the third electrode sub-region to the sub-electrode unit T102.

Specifically, the main electrode unit T101 may be a bright region of the pixel unit 10, the sub-electrode unit T102 may be a dark region of the pixel unit 10.

It should be understood that a multi-domain structure is provided in both the bright and dark regions of one pixel unit, and an area ratio of the first electrode sub-region A1 to the main electrode unit T101 is equal to an area ratio of the third electrode sub-region to the sub-electrode unit T102, making screen display of the display panel more uniform and reducing a risk of uneven display of the display panel.

In an embodiment, the first sub-pixel unit includes a cross-shaped first trunk electrode T2021 and a first sub-electrode T3021 connected to the first trunk electrode T2021, the first trunk electrode T2021 divides the main electrode unit T101 into four main display domains T1, the first sub-electrode T3021 extends from the first trunk electrode T2021 along a different direction, and extending directions of the first sub-electrode T3021 in a same main display domain T1 are same; and/or, the second sub-pixel unit includes a cross-shaped second trunk electrode T2022 and a second sub-electrode T3022 connected to the second trunk electrode T2022, the second trunk electrode T2022 divides the sub-electrode unit T102 into four secondary display domains T2, the second sub-electrode T3022 extends from the second trunk electrode T2022 along a different direction, and extending directions of the second sub-electrodes T3022 in a same secondary display domain T2 are same;
  wherein, the first sub-electrode T3021 has a first width in the first electrode sub-region A1 and a second width in the second electrode sub-region A2, the first width is different from the second width; the second sub-electrode T3022 has a third width in the third electrode sub-region A3 and a fourth width in the fourth electrode sub-region A4, the third width is different from the fourth width.

In a specific embodiment as shown in FIG. 6, FIG. 7, FIG. 8, and FIG. 9, the pixel electrode 100 may include a 3T structure (in three thin film transistors (TFTs), an end of a third TFT is connected to an array common electrode), may also include a 3T plus structure (in three TFTs, a third TFT is connected to a separate metal layer signal line), wherein the 3T structure and the 3T plus structure are both 8-domain structures. The 3T structure and the 3T Plus structure form a dual 8-domain structure on a basis of an original 8-domain structure, so that a problem of color shift of the display panel is solved, and a technical support is provided for a subsequent research and development of high-end display panels. The first sub-pixel unit and/or the second sub-pixel unit includes a main region thin film transistor $T_{main}$, a main region liquid crystal capacitor $C_{lc\_main}$, a main region stor-age capacitor $C_{st\_main}$, a sub region thin film transistor $T_{sub}$, a sub region liquid crystal capacitor $C_{lc\_sub}$, and a sub region storage capacitor $C_{st\_sub}$, and a shared thin film transistor $T_{cs}$. A scan line Gate is respectively set for each row of sub-pixels, and a data line Data is respectively set for each column of sub-pixels. A gate of the main region thin film transistor $T_{main}$ is connected to the scan line Gate, and a source/drain electrode thereof is connected to the data line Data. The main region liquid crystal capacitor $C_{lc\_main}$ and the main region storage capacitor $C_{st\_main}$ are connected in parallel between the drain/source electrode and a common electrode Array Com (or CF Com). The gate of the sub-region thin film transistor $T_{sub}$ is connected to the scanning line Gate, its source/drain is connected to the data line Data. The sub-region liquid crystal capacitor $C_{lc\_sub}$ and the sub-region storage capacitor $C_{st\_sub}$ are connected in parallel between the drain/source electrode and the common electrode Array Com (or CF Com). The gate of the shared thin film transistor $T_{cs}$ is connected to the scan line Gate, and the source and drain electrode thereof are respectively connected to the drain/source electrode and the common electrode Array Com of the thin film transistor $T_{sub}$ in the sub-region.

Figure 7:
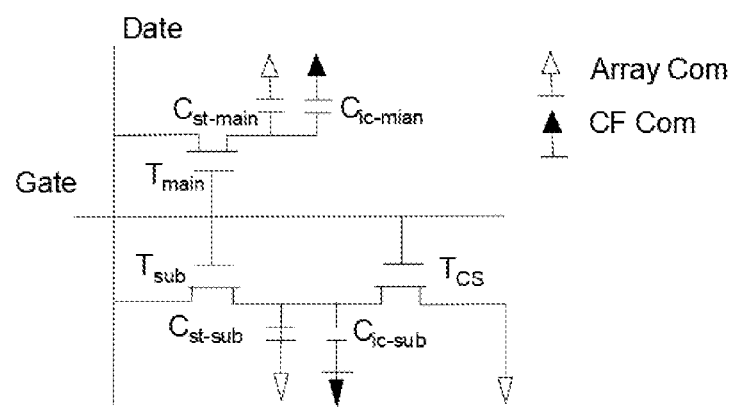
FIG. 7 is a circuit diagram of a connection of a pixel unit provided by another embodiment of the present application.

Specifically, as shown in FIG. 6 and FIG. 7, FIG. 6 is a structural diagram of a pixel unit with a 3T structure, and FIG. 7 is a circuit diagram of a connection of three TFTs with a 3T structure, as shown in FIG. 6, an upper part is the main electrode unit T101, a lower part is the sub-electrode unit T102, the main electrode unit T101 and the sub-electrode unit T102 form a dual 8-domain structure together in the embodiment, so that a problem of color shift of the display panel can be solved, and a technical support is provided for a subsequent research and development of high-end display panels.

Figure 8:
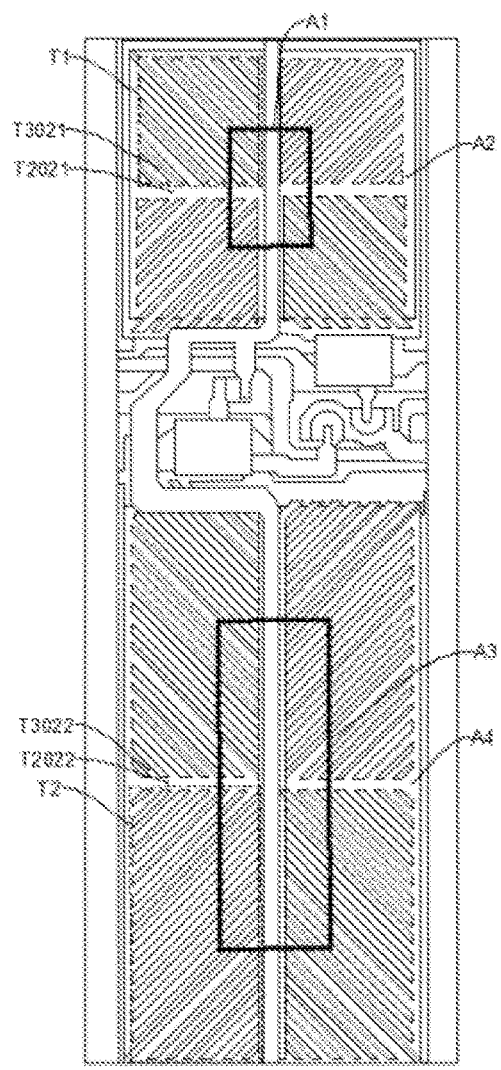
FIG. 8 is a schematic structural diagram of a pixel unit provided by yet another embodiment of the present application.
Figure 9:
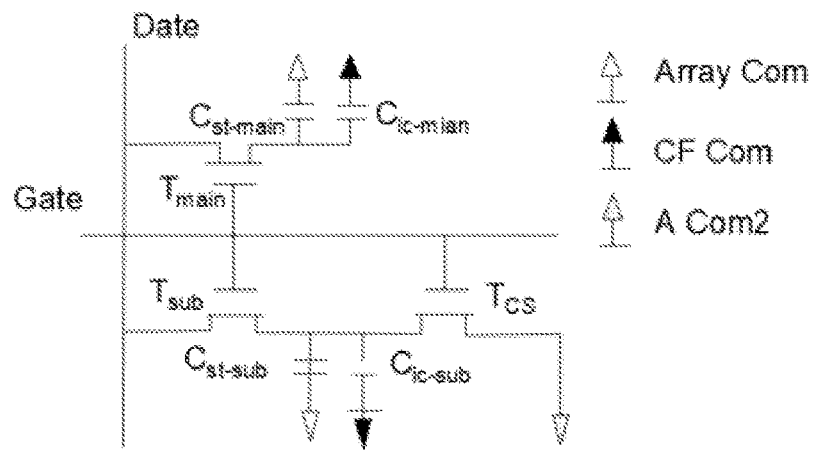
FIG. 9 is a circuit diagram of a connection of a pixel unit provided by yet another embodiment of the present application.

Specifically, as shown in FIG. 8 and FIG. 9, FIG. 8 is a structural diagram of a pixel unit with a 3T plus structure, and FIG. 9 is a circuit diagram of a connection of three TFTs with a 3T plus structure, as shown in FIG. 8, an upper part is the main electrode unit T101, a lower part is the sub-electrode unit T102, the main electrode unit T101 and the sub-electrode unit T102 form a dual 8-domain structure together in the embodiment, so that a problem of color shift of the display panel can be solved, and a technical support is provided for a subsequent research and development of high-end display panels.

Specifically, the first sub-electrode T3021 has a first width in the first electrode sub-region A1 and a second width in the second electrode sub-region A2, the first width is different from the second width; the second sub-electrode T3022 has a third width in the third electrode sub-region A3 and a fourth width in the fourth electrode sub-region A4, the third width is different from the fourth width, wherein the first width is different from the second width, the third width is different from the fourth width, the first width and the third width/fourth width can be same or different, a width difference between the first width and the second width and a width difference between the third width and the fourth width can be same or different, which can be adjusted according to actual production situations.

It should be understood that in the embodiment, the pixel electrode 100 of the pixel unit 10 in the array substrate is arranged to include the main electrode unit T101 and the sub-electrode unit T102, the main electrode unit T101 includes four main display domains T1, the sub-electrode unit T102 includes four secondary display domains T2, the first sub-electrode T3021 has the first width in the first electrode sub-region A1 and the second width in the second electrode sub-region A2, the first width is different from the second width; the second sub-electrode T3022 has the third width in the third electrode sub-region A3 and the fourth width in the fourth electrode sub-region A4, the third width is different from the fourth width, making two different electrode sub-regions in one sub-pixel unit (the first sub-pixel unit or the second sub-pixel unit) have different capacitance, and forming different electric fields, and forming multiple viewing angles inside a same pixel unit to achieve complementary viewing angles, so that a problem of color shift of liquid crystal display panels is completely solved, and a technical support is provided for a subsequent research and development of high-end display panels.

In an embodiment, in any one of the main display domains T1, at least one of the first sub-electrodes T3021 includes a first sub-electrode segment with the first width and a second sub-electrode segment with the second width, in any one of the secondary display domains T2, the second sub-electrode includes a third sub-electrode segment with the third width and a fourth sub-electrode segment with the fourth width.

Specifically, as shown in FIG. 6, the first electrode sub-region A1 includes a part of the four main display domains T1, the third electrode sub-region A3 includes a part of the four secondary display domains T2, the second electrode sub-region A2 includes a part of the four main display domains T1, the fourth electrode sub-region A4 includes a part of the four secondary display domains T2, therefore, in one domain region at least one of the branch electrodes 300 includes a first sub-electrode segment located in the first electrode sub-region A1 and a second sub-electrode segment located in the second electrode sub-region A2, the two electrode segment electrodes are an integrally formed structure.

Specifically, the first sub-electrode segment has a first width, the second sub-electrode segment has a second width, the first width may be greater than the second width, the first width may be less than the second width.

In an embodiment, widths of the first sub-electrodes T3021 in each of the main display domains T1 are equal, widths of the second sub-electrodes T3022 in each of the secondary display domains T2 are equal, the first sub-electrodes T3021 in at least one of the main display domains T1 have a first width, the first sub-electrodes T3021 in at least one of the main display domains T1 have a second width; the second sub-electrode T3022 in at least one of the secondary display domains T2 have a third width, the second sub-electrode T3022 in at least one of the secondary display domains T2 have a fourth width.

Specifically, in the main electrode unit T101, the first electrode sub-region A1 may include one main display domain T1 or two main display domains T1, the second electrode sub-region A2 may include one main display domain T1 or two main display domains T1.

Specifically, in the sub-electrode unit T102, the third electrode sub-region A3 may include one secondary display domain T2 or two secondary display domains T2, the fourth electrode sub-region A4 may include one secondary display domain T2 or two secondary display domains T2.

Specifically, in the embodiment, widths of each of segments of the sub-electrodes in different electrode sub-regions (including the first electrode sub-region A1, the second electrode sub-region A2, the third electrode sub-region A3, and the fourth electrode sub-region A4) are same; it should be understood that, since the sub-electrodes formed in one electrode sub-region have a same width, it is more convenient in production than sub-electrodes with different widths.

In an embodiment, the first sub-pixel unit includes a first electrode sub-region A1, a second electrode sub-region A2, and a fifth electrode sub-region A5, the plurality of branch electrodes 300 include a first electrode located in the first electrode sub-region A1, a second electrode located in the second electrode sub-region A2, and a third electrode located in the fifth electrode sub-region A5, widths of the first electrode, the second electrode, and the third electrode are different from each other.

Specifically, the first electrode sub-region A1, the second electrode sub-region A2, and the fifth electrode sub-region A5 may be arranged side by side, or may be arranged in a surrounding sequence as shown in FIG. 5.

Specifically, as shown in FIG. 5, the first sub-pixel unit includes three electrode sub-regions, the three electrode sub-regions are arranged in a surrounding sequence, at least one of the branch electrodes 300 includes a first electrode segment 310 located in the first electrode sub-region A1, a second electrode segment 320 located in the second electrode sub-region A2 and a third electrode segment 330 located in the fifth electrode sub-region A5, the three electrode segments are an integrally formed structure.

It can be understood that by arranging a plurality of electrode sub-regions, three electric fields of different strength can be formed in different electrode sub-regions of the pixel unit 10, which can solve a problem of color shift of the display panel in a more refined manner and improve display uniformity of the display panel.

In an embodiment, a width difference of the branch electrodes 300 with different widths in the first electrode sub-region A1 and the second electrode sub-region A2 ranges from 0.15 um to 0.35 um.

The width difference between the branch electrodes 300 in the first electrode sub-region A1 and the branch electrodes 300 in the second electrode sub-region A2 ranges from 0.15 um to 0.35 um, specifically, it can be any one of 0.15 um, 0.16 um, 0.20 um, 0.22 um, 0.24 um, 0.27 um, 0.28 um, 0.30 um, 0.31 um, and 0.35 um, which can be selected according to actual production situations.

It can be understood that, by reasonably controlling the width difference of the branch electrodes 300 in different electrode sub-regions, a situation that the width difference of the branch electrodes 300 with different widths being too large results in a strength difference in electric field being too large and display being uneven is prevented, so a risk of uneven display is reduced.

In addition, a display device is provided in the present application, which includes the array substrate as mentioned in any one of embodiments above.

In summary, the present application arranges the pixel electrode 100 of the pixel unit in the array substrate to at least include the first pixel sub-electrode 101 and the second pixel sub-electrode 102, and the first pixel sub-electrode 101 includes at least the first electrode sub-region A1 and a second electrode sub-region A2, and the widths of the branch electrodes 300 in the two electrode sub-regions are different, making the capacitance structures of the first sub-pixel units in the first electrode sub-region A1 and the second electrode sub-region A2 have different capacitance to form different electric fields, so that the liquid crystals in different regions in the pixel unit 10 can be deflected at different angles, so that multiple viewing angles are formed inside a same pixel unit 10 to achieve complementary viewing angles and a problem of color shift of liquid crystal display panels is solved.

It can be understood that, for those of ordinary skill in the art, equivalent replacements or changes can be made according to technical solutions of the present application and an inventive concept thereof, and all these changes or replacements should belong to a protection scope of the appended claims of the present application.

The invention claimed is:

1. An array substrate, wherein comprising: a base substrate and a plurality of pixel units arranged on the base substrate at intervals, each of the pixel units at least comprising a first sub-pixel unit and a second sub-pixel unit; a pixel electrode arranged in the pixel unit, and the pixel electrode at least comprising a first pixel sub-electrode and a second pixel sub-electrode, the first pixel sub-electrode and the second pixel sub-electrode being arranged in the first sub-pixel unit and the second sub-pixel unit respectively, the first pixel sub-electrode comprising a trunk electrode and a plurality of branch electrodes connected to the trunk electrode respectively;

wherein, the first sub-pixel unit at least comprises a first electrode sub-region and a second electrode sub-region, and widths of the branch electrodes in the first electrode sub-region and the second electrode sub-region are different, wherein the first sub-pixel unit comprises the first electrode sub-region, the second electrode sub-region, and a fifth electrode sub-region, the plurality of the branch electrodes comprise a first electrode located in the first electrode sub-region, a second electrode located in the second electrode sub-region, and a third electrode located in the fifth electrode sub-region, widths of the first electrode, the second electrode, and the third electrode are different from each other.

2. The array substrate as claimed in claim 1, wherein the plurality of the branch electrodes comprise a first branch electrode located in the first electrode sub-region and a second branch electrode located in the second electrode sub-region, widths of the first branch electrode and the second branch electrode are different.

3. The array substrate as claimed in claim 2, wherein the first sub-pixel unit comprises the first electrode sub-region and the second electrode sub-region, an area of the first electrode sub-region accounts for 20% to 40% of a total area of the first sub-pixel unit.

4. The array substrate as claimed in claim 1, wherein at least one of the branch electrodes comprises a first electrode segment located in the first electrode sub-region and a second electrode segment located in the second electrode sub-region, widths of the first electrode segment and the second electrode segment are different.

5. The array substrate as claimed in claim 4, wherein the first sub-pixel unit comprises the first electrode sub-region and the second electrode sub-region, an area of the first electrode sub-region accounts for 20% to 40% of a total area of the first sub-pixel unit.

6. The array substrate as claimed in claim 1, wherein the second pixel sub-electrode comprises a trunk electrode and a plurality of branch electrodes connected to the trunk electrode respectively;

the second sub-pixel unit at least comprises a third electrode sub-region and a fourth electrode sub-region, widths of the branch electrodes in the third electrode sub-region and the fourth electrode sub-region are different.

7. The array substrate as claimed in claim 6, wherein an area of the first sub-pixel unit is less than an area of the second sub-pixel unit, an area ratio of the first electrode sub-region in the first sub-pixel unit is same as an area ratio of the third electrode sub-region in the second sub-pixel unit.

8. The array substrate as claimed in claim 6, wherein the first sub-pixel unit comprises a cross-shaped first trunk electrode and a first sub-electrode connected to the first trunk electrode, the first trunk electrode divides the first sub-pixel unit into four main display domains, the first sub-electrode extends from the first trunk electrode along a different direction, and extending directions of the first sub-electrodes in a same main display domain are same; and the second sub-pixel unit comprises a cross-shaped second trunk electrode and a second sub-electrode connected to the second trunk electrode, the second trunk electrode divides the second sub-pixel unit into four secondary display domains, the second sub-electrode extends from the second trunk electrode along a different direction, and extending directions of the second sub-electrodes in a same secondary display domain are same;

wherein the first sub-electrode has a first width in the first electrode sub-region and a second width in the second electrode sub-region, the first width is different from the second width; the second sub-electrode has a third width in the third electrode sub-region and a fourth width in the fourth electrode sub-region, the third width is different from the fourth width.

9. The array substrate as claimed in claim 8, wherein in any one of the main display domains, at least one of the first sub-electrodes comprises a first sub-electrode segment with the first width and a second sub-electrode segment with the second width, in any one of the secondary display domains, the second sub-electrode comprises a third sub-electrode segment with the third width and a fourth sub-electrode segment with the fourth width.

10. The array substrate as claimed in claim 8, wherein widths of the first sub-electrodes in each of the main display domains are equal, widths of the second sub-electrodes in each of the secondary display domains are equal, the first sub-electrodes in at least one of the main display domains have the first width, and the first sub-electrodes in at least one of the main display domains have the second width; the second sub-electrodes in at least one of the secondary display domains have the third width, the second sub-electrodes in at least one of the secondary display domains have the fourth width.

11. The array substrate as claimed in claim 1, wherein a width difference of the branch electrodes with different widths in the first electrode sub-region and the second electrode sub-region ranges from 0.15 um to 0.35 um.

12. A display device, comprising an array substrate, wherein the array substrate comprises:

a base substrate and a plurality of pixel units arranged on the base substrate at intervals, each of the pixel units at least comprising a first sub-pixel unit and a second sub-pixel unit; a pixel electrode arranged in the pixel unit, and the pixel electrode at least comprising a first pixel sub-electrode and a second pixel sub-electrode, the first pixel sub-electrode and the second pixel sub-electrode being arranged in the first sub-pixel unit and the second sub-pixel unit respectively, the first pixel sub-electrode comprising a trunk electrode and a plurality of branch electrodes connected to the trunk electrode respectively;

wherein, the first sub-pixel unit at least comprises a first electrode sub-region and a second electrode sub-region, and widths of the branch electrodes in the first electrode sub-region and the second electrode sub-region are different, wherein the first sub-pixel unit comprises the first electrode sub-region, the second electrode sub-region, and a fifth electrode sub-region, the plurality of the branch electrodes comprise a first electrode located in the first electrode sub-region, a second electrode located in the second electrode sub-region, and a third electrode located in the fifth electrode sub-region, widths of the first electrode, the second electrode, and the third electrode are different from each other.

13. The display device as claimed in claim 12, wherein the plurality of the branch electrodes comprise a first branch electrode located in the first electrode sub-region and a second branch electrode located in the second electrode sub-region, widths of the first branch electrode and the second branch electrode are different.

14. The display device as claimed in claim 13, wherein the first sub-pixel unit comprises the first electrode sub-region and the second electrode sub-region, an area of the first electrode sub-region accounts for 20% to 40% of a total area of the first sub-pixel unit.

15. The display device as claimed in claim 12, wherein at least one of the branch electrodes comprises a first electrode segment located in the first electrode sub-region and a second electrode segment located in the second electrode sub-region, widths of the first electrode segment and the second electrode segment are different.

16. The display device as claimed in claim 15, wherein the first sub-pixel unit comprises the first electrode sub-region and the second electrode sub-region, an area of the first electrode sub-region accounts for 20% to 40% of a total area of the first sub-pixel unit.

17. The display device as claimed in claim 12, wherein the second pixel sub-electrode comprises a trunk electrode and a plurality of branch electrodes connected to the trunk electrode respectively;

the second sub-pixel unit at least comprises a third electrode sub-region and a fourth electrode sub-region, widths of the branch electrodes in the third electrode sub-region and the fourth electrode sub-region are different.

18. The display device as claimed in claim 17, wherein an area of the first sub-pixel unit is less than an area of the second sub-pixel unit, an area ratio of the first electrode sub-region in the first sub-pixel unit is same as an area ratio of the third electrode sub-region in the second sub-pixel unit.

19. The display device as claimed in claim 17, wherein the first sub-pixel unit comprises a cross-shaped first trunk electrode and a first sub-electrode connected to the first trunk electrode, the first trunk electrode divides the first sub-pixel unit into four main display domains, the first sub-electrode extends from the first trunk electrode along a different direction, and extending directions of the first sub-electrodes in a same main display domain are same; and the second sub-pixel unit comprises a cross-shaped second trunk electrode and a second sub-electrode connected to the second trunk electrode, the second trunk electrode divides the second sub-pixel unit into four secondary display domains, the second sub-electrode extends from the second trunk electrode along a different direction, and extending directions of the second sub-electrodes in a same secondary display domain are same;

wherein the first sub-electrode has a first width in the first electrode sub-region and a second width in the second electrode sub-region, the first width is different from the second width; the second sub-electrode has a third width in the third electrode sub-region and a fourth width in the fourth electrode sub-region, the third width is different from the fourth width.

20. The array substrate as claimed in claim 1, wherein the pixel electrode further comprises a third pixel sub-electrode, the third pixel sub-pixel comprising a trunk electrode and a plurality of branch electrode connected to the trunk electrode respectively.

* * * * *